Patented Mar. 1, 1932

1,847,836

UNITED STATES PATENT OFFICE

ANDREW KELLY, OF LONDON, ENGLAND, ASSIGNOR TO BORAX CONSOLIDATED LIMITED, OF LONDON, ENGLAND

PRODUCTION OF SODIUM METABORATE

No Drawing. Application filed October 31, 1929, Serial No. 403,910, and in Great Britain April 9, 1929.

This invention has for its object the production of sodium metaborate more economically than it is produced at present.

It is known that sodium metaborate may be prepared by adding the requisite amount of sodium hydroxide to borax or boric acid. It is also known that sodium hydroxide may be prepared by the interaction of sodium carbonate with lime.

According to the present invention these two reactions are combined and the invention comprises the process wherein a boron compound is digested in water with a determined quantity of sodium carbonate and lime, in the presence of heat, sodium metaborate formed in the reaction being, after filtration, crystallized out.

Thus, for example, a crude borax, sodium borate, such as tincal, rasorite, or other boron mineral, or boric acid, may be digested in water with sodium carbonate and lime, in the presence of heat, until reaction has taken place, forming sodium metaborate in solution together with impurities and calcium carbonate. The sodium metaborate solution is then filtered and crystallized in the usual manner.

The calcium carbonate formed in the reaction being disseminated throughout the insoluble matter normally present in the crude minerals greatly assists filtration and washing.

To produce, on a commercial scale, approximately five tons of sodium metaborate, a pan or decomposer of 2,500 gallons capacity should be charged with:—

| | |
|---|---|
| Rasorite (33% $B_2O_3$) | 135.3 cwts. |
| Soda ash | 34.11 cwts. |
| Lime (95% CaO) | 20.80 cwts. |
| Water | 1508 gallons |

The charge is kept agitated at a temperature of about 80° C. for five hours after which it is filtered and the mud washed in the normal manner.

The filtered strong liquor and washings will amount to about 2150 gallons of a gravity of 1.375. This liquor may be a bright green in which case it must be bleached and re-filtered through a liquor press, after which metaborate of soda may be obtained by the usual methods of crystallization or granulation.

The mother liquor which has a gravity of about 1.25 will be incorporated in the next charge.

In some cases the boron compound employed may comprise rasorite mixed with tincal.

What I claim is:—

1. Process for the production of sodium metaborate comprising, digesting a boron compound in water with an excess quantity of sodium carbonate and lime in the presence of heat, filtering the carbonate formed, and recovering the sodium metaborate from the filtrate.

2. Process for the production of sodium metaborate comprising, digesting a sodium borate in water with an excess quantity of sodium carbonate and lime in the presence of heat, filtering the carbonate formed, and recovering the sodium metaborate from the filtrate.

3. Process for the production of sodium metaborate comprising, digesting rasorite in water with an excess quantity of sodium carbonate and lime in the presence of heat, filtering the carbonate formed, and recovering the sodium metaborate from the filtrate.

4. Process for the production of sodium metaborate comprising, digesting a boron compound in water with an excess of sodium carbonate and lime kept at a relatively high temperature until a by-product of calcium carbonate is obtained, the presence of which facilitates filtration for the recovery of sodium metaborate.

5. Process for the production of sodium metaborate comprising, digesting a boron compound in water with an excess of sodium carbonate and lime, kept at a temperature of about 80° C. for approximately five hours, whereby to form calcium carbonate, the presence of which facilitates filtration for the recovery of sodium metaborate.

In testimony whereof he affixes his signature.

ANDREW KELLY.